May 8, 1923.
J. C. GEILS
TOWLINE HITCH
Filed Dec. 27, 1921
1,454,437
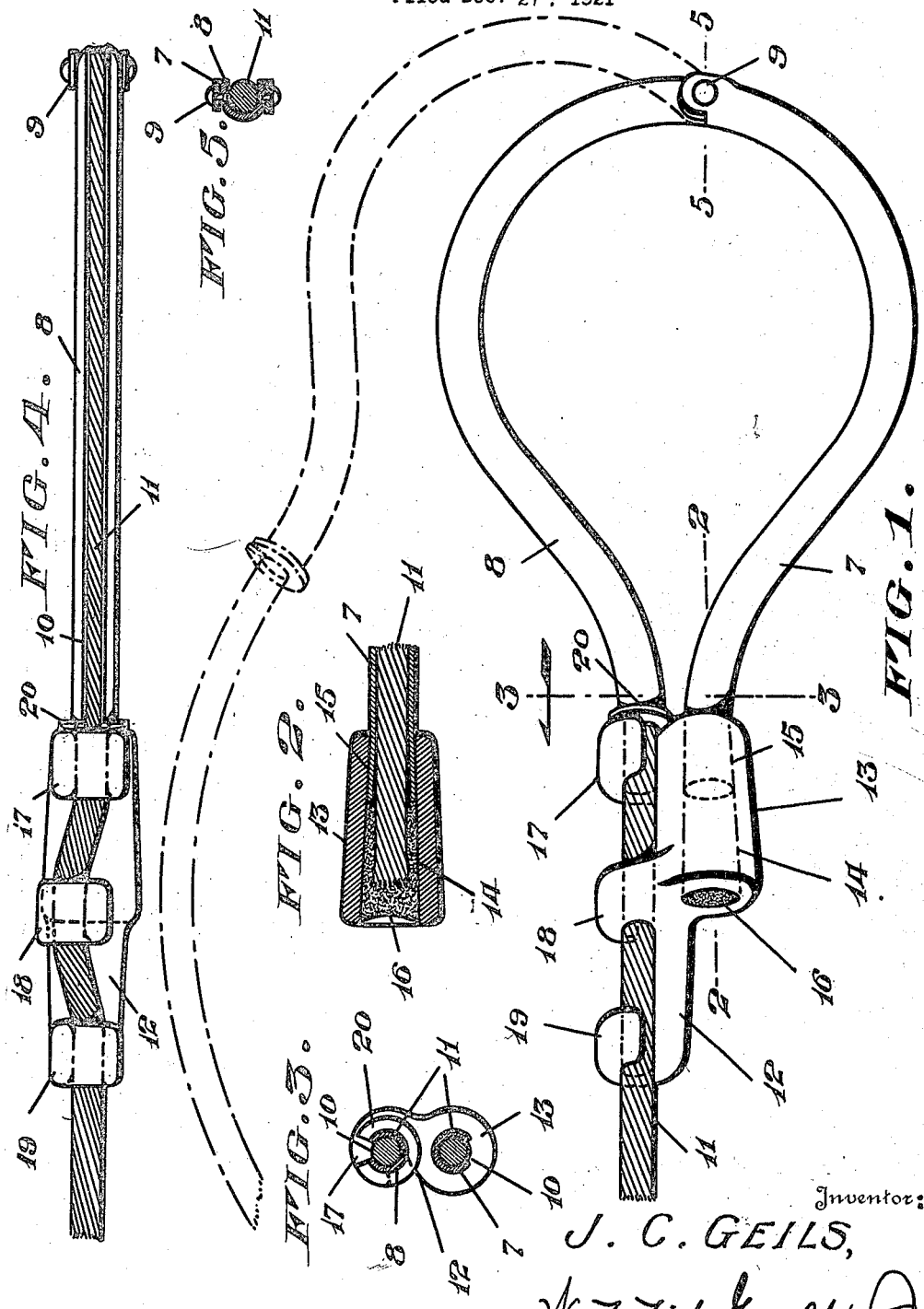
Inventor:
J. C. GEILS,
By W. J. FitzGerald & Co.
Attorney.

Patented May 8, 1923.

1,454,437

UNITED STATES PATENT OFFICE.

JOHN C. GEILS, OF BENSENVILLE, ILLINOIS.

TOWLINE HITCH.

Application filed December 27, 1921. Serial No. 525,233.

*To all whom it may concern:*

Be it known that I, JOHN C. GEILS, a citizen of the United States, residing at Bensenville, in the county of Du Page and State of Illinois, have invented certain new and useful Improvements in Towline Hitches; and I do hereby declare the following to be a full, clear, and exact description of the invention, such as will enable others skilled in the art to which it appertains to make and use the same.

The present invention relates to devices or couplings for detachably anchoring or fastening the ends of ropes, cables, and the like, to other objects, and the invention aims to provide a novel and improved device of that kind which is especially useful as a tow line hitch for use when towing an automobile or other vehicle, although the device can be used for other purposes also.

It is the object of the invention to provide a coupling or hitch of novel construction forming a terminal loop or hook for the cable or rope to surround an axle or other part of the vehicle or object to which the cable or rope is to be attached, and the construction being such that the cable or rope cannot pull loose, as well as preventing the cable or rope from being cut or chafed.

A further object is the provision of such a device comprising a loop or hook member in which the terminal portion of the cable or rope is disposed, said member being adapted to be opened for placing it around an axle or other part of the object, and means being provided for holding said member closed in an efficient and simple manner.

A still further object is the provision of such a device comprising a member to which one section or part of the loop or hook member is secured, and also having means for the engagement of the cable or rope for holding said loop or hook member closed.

It is also the object of the invention to provide such a device which is comparatively simple and inexpensive in construction, as well as being thoroughly practical and efficient in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a perspective view of the device, looking at one side thereof, and showing the loose section or part of the loop or hook member swung open in dotted lines.

Figs. 2 and 3 are sectional details taken on the respective lines 2—2 and 3—3 of Fig. 1.

Fig. 4 is an edge elevation of the device.

Fig. 5 is a cross section on the line 5—5 of Fig. 1.

The loop or hook member comprises the pressed steel complementary companion sections or parts 7 and 8 which are of compound curved shape in reversed positions, to constitute a loop, when they are swung together, and which are hingedly or pivotally connected, as at 9, at the bend of the loop, whereby said sections or parts can be swung apart for placing them around an axle or other portion of an object. The sections 7 and 8 are of arcuate cross-section, being in the form of tubes open along their outer sides, as at 10, whereby the cable or rope 11 can be conveniently placed within said sections and the sections are stiff to retain their shape. The openings or slots 10 are preferably slightly narrower than the diameter of the cable or rope, whereby the cable or rope in being forced laterally into the sections 7 and 8, will spring the edges of said sections apart to embrace the cable or rope and hold it snugly in place. The cable thus extends around the loop or hook member and lies within the same, whereby the terminal portion of the cable forms a loop.

A member 12 is provided, which is a casting or forging, to which the section 7 is secured and the terminal of the cable anchored. The member 12 is disposed at the terminals of the loop or hook member opposite to the hinge or pivot 9, and the member 12 is formed at one side with a longitudinal socket portion or sleeve 13 having both ends open, with the socket or bore 14 tapered toward that end nearest to the loop member. The corresponding terminal of the section 7 of the loop member is fitted within the smaller end portion of the socket or bore 14 and is expanded, as at 15, into the socket, for securing said section 7 to the member 12, and the terminal of the cable or rope 14 is embedded within a tapered plug 16 of Babbitt metal, or the like, and said plug is fitted in the socket or bore 14 from the larger end, thereby securely anchoring the terminal of the cable to the member 12. The section 7 of the loop member and terminal of the cable are thus securely fastened or anchored to the member 12 which forms a shank or stem for the loop or hook formed by the sections 7 and 8, and the member or shank 12 is provided with means for the detachable engagement of the cable or rope to hold the loop closed. Thus, said member 12 is formed at that side opposite to the socket portion or sleeve 13 with longitudinally spaced lateral hooks 17, 18 and 19 which are in reversed positions alternately. The hooks 17 and 19 are in the same position and the intermediate hook 18 is in reversed position, whereby the cable when engaged within the hooks extends in a zigzag manner across the hooks, as seen in Fig. 4. The free terminal of the section 8 has an outstanding flange 20 which moves closely adjacent to the end hook 17 when the loop member is closed. The mouths of the hooks 17, 18 and 19 are preferably restricted in order that the cable or rope must be snapped or forced into the hooks, so as to avoid the accidental slipping of the cable from the hooks, although the cable can be readily pulled from the hooks by hand.

In using the device, the cable 11 is withdrawn from the hooks, which enables the loop or hook member to be opened, by swinging the sections 7 and 8 apart. The device can then be hooked around the axle of a vehicle or other part of the object to which the cable is to be connected, after which the sections 7 and 8 are swung together around the axle or other part. The cable 11 can spring over the end of the hook 17, the section 8 springing slightly, if necessary, to permit said cable to pass across the end of said hook. The cable is then engaged within the hooks 17, 18 and 19 in succession across the opposite sides thereof to be embraced by the bills of the hooks, which will hold the device closed around the axle or other part. The cable in laying within the open-sided tubular sections 7 and 8, will be protected against being cut or chafed and the device will provide a secure fastening for the cable or rope.

It is also possible to conveniently replace the cable or rope, because the same can be readily withdrawn from the sections 7 and 8 and the plug 16 also withdrawn from the socket 14.

Having thus described the invention, what is claimed as new is:—

1. A terminal coupling for a cable comprising a loop member composed of sections connected by a hinge joint so that the sections can be swung apart for placing them around a portion of an object, a cable assembled with said member and a member secured to one end of the loop member and having means for the engagement of the cable to hold the loop member closed.

2. A terminal coupling for a cable comprising a loop member composed of sections having a hinge joint permitting the sections to be swung apart for placing the member around a portion of an object, a cable extending around said member, and a member to which one end of the loop member and terminal of the cable are secured and having means for the engagement of the cable to hold the loop member closed.

3. A terminal coupling for a cable comprising a loop member composed of sections having a hinge joint connecting them permitting the sections to be swung apart for placing the member around a portion of an object, a cable extending around said member and a member secured to one terminal of said loop member and having reversed hooks for the engagement of the cable to hold said loop member closed.

4. A terminal coupling for a cable comprising a loop member composed of sections having a hinge joint connection permitting the sections to be swung apart for placing the member around a portion of an object, a cable extending around said member, and a member having a socket at one side in which one terminal of the loop member and terminal of the cable are secured, the last named member having reversed hooks at the opposite side for the engagement for the cable to hold the member closed.

5. A terminal coupling for a cable comprising a loop member composed of sections connected by a hinge joint permitting the sections to be swung apart for placing the member around a portion of an object, a cable extending around said member, and a member having a portion at one side to which one terminal of said loop member and the terminal of the cable are secured and having means at the opposite side for the detachable connection of the cable to hold the loop member closed.

6. A terminal coupling for a cable comprising a loop member composed of sections having a hinge joint to permit the sections to be swung apart for placing the member around a portion of an object, said member being formed so that the cable can be fitted therein, and means carried by one terminal of said member for receiving a cable to hold said member closed.

7. A terminal coupling for a cable comprising a loop member composed of sections of open sided tubing in which a cable can be fitted and having a hinge joint permitting the sections to be swung apart for placing said member around a portion of an object, and means carried by one terminal of said member for engaging the cable where it extends from the other end of said member.

8. A terminal coupling for a cable comprising a loop member for receiving the terminal portion of the cable and comprising hingedly connected sections to be swung apart for placing the member around a portion of an object, and means for holding the terminals of said member together.

9. A terminal coupling for a cable comprising a loop member composed of sections connected by a hinge joint permitting the sections to be swung apart for placing said member around a portion of an object, a cable assembled with said member and means for holding the terminals of said member together.

10. A terminal coupling for a cable comprising a loop member composed of open sided tubing in which the terminal portion of a cable can be fitted, said member having hinged sections to be opened for placing the member around a portion of an object, and means for holding said member closed.

11. A terminal coupling for a cable comprising a loop member composed of sections hingedly connected so that they can be swung apart for placing said member around a portion of an object, a cable having its terminal portion extending around and fitted within said member, and a member to which one terminal of the loop member and terminal of the cable are secured, the other terminal of the loop member and the second named member being brought adjacent to one another when the loop member is closed, and the second named member having means for the engagement of the cable beyond the second named terminal of the loop member when said loop member is closed.

In testimony whereof I have signed my name to this specification.

JOHN C. GEILS.